J. F. SCHICKE.
COMBINATION LOCK.
APPLICATION FILED JULY 19, 1918.
1,388,378.
Patented Aug. 23, 1921.
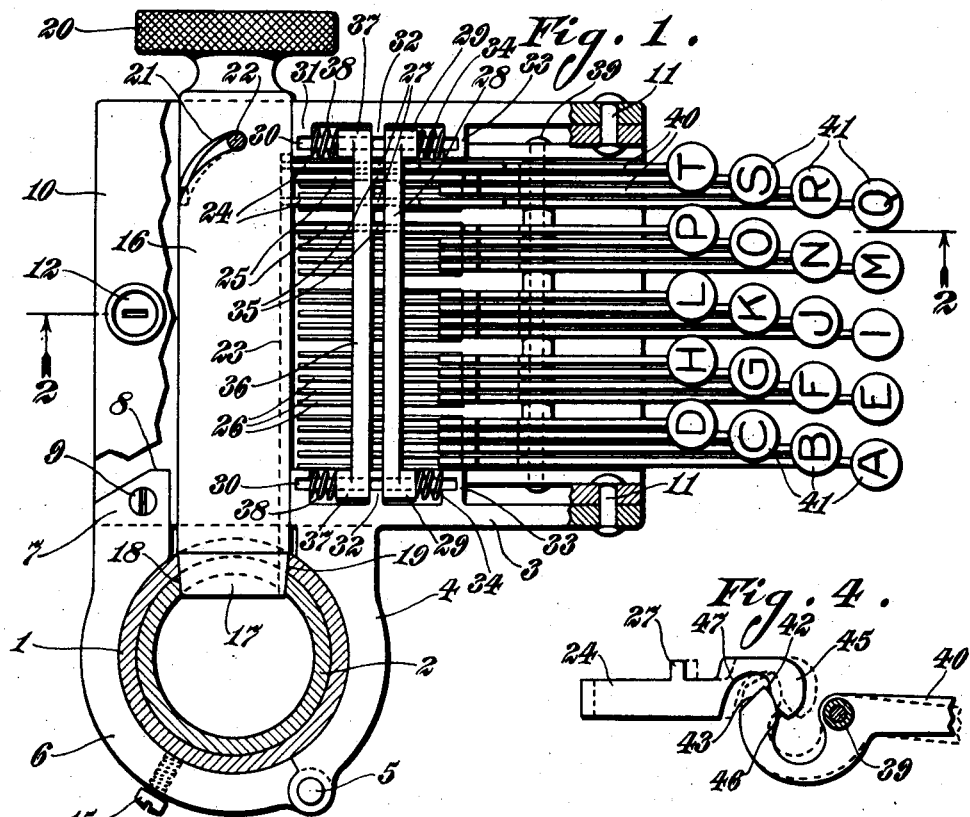
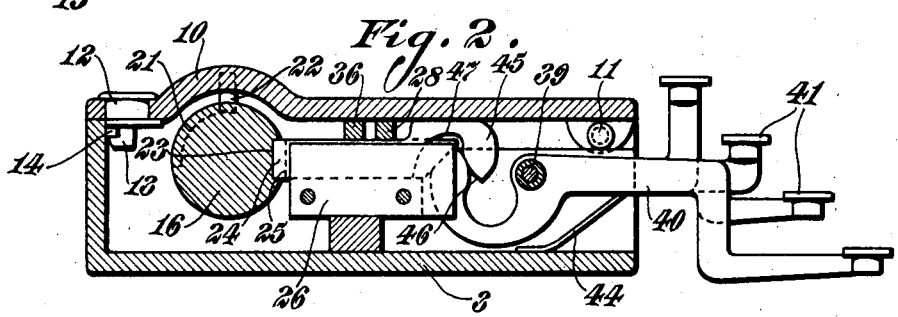
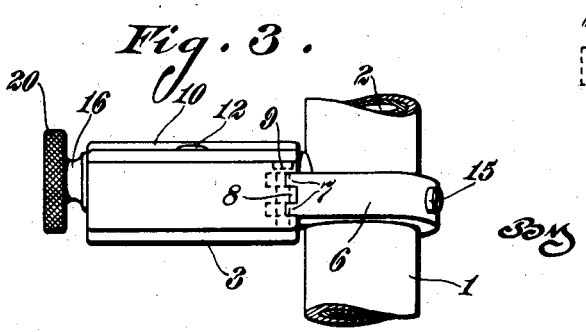
Inventor:
JOSEF F. SCHICKE,
By John N. Breninger
His Attorney.

UNITED STATES PATENT OFFICE.

JOSEF F. SCHICKE, OF ST. LOUIS, MISSOURI, ASSIGNOR TO JOSEF F. SCHICKE, TRUSTEE, OF ST. LOUIS, MISSOURI.

COMBINATION-LOCK.

1,388,378. Specification of Letters Patent. Patented Aug. 23, 1921.

Application filed July 19, 1918. Serial No. 245,734.

*To all whom it may concern:*

Be it known that I, JOSEF F. SCHICKE, a citizen of the United States, and residing at St. Louis, Missouri, have invented the new and useful Improvement in Combination-Locks, of which the following is a specification.

This invention relates to locks and more particularly to combination locks adapted for locking automobiles in such a manner as to prevent unauthorized use thereof.

Automobiles are locked in various manners, the two principal ones being by key locks and by the ordinary combination locks employing dials. The employment of dials is, however, impractical for a lock must frequently be opened at night when the dials cannot be properly positioned.

One of the objects of this invention, therefore, is to provide an automobile lock, especially adapted for locking the steering shaft, which employs a series of tumblers, and buttons for controlling the tumblers, which can be readily operated to open the lock.

Another object of this invention is to provide a combination lock employing tumblers and buttons, which is simple in construction, effective in its action and cheap to manufacture.

Further objects of this invention will appear from the detail description taken in connection with the accompanying drawing, in which, Figure 1 is a plan of an automobile lock embodying this invention, part of the casing being cut away to show the interior construction;

Fig. 2 is a section on the line 2—2, Fig. 1;

Fig. 3 is a side elevation showing the attachment of the lock casing to the steering column;

Fig. 4 is a detail of said tumbler and button mechanism, showing one of the tumblers; and, Fig. 5 is a view similar to Fig. 4, but showing another of the tumblers.

Referring to the accompanying drawing, 1 designates the steering column of an automobile and 2 the steering shaft mounted therein. Lock casing 3 is adapted for attachment to the steering column and for this purpose this lock casing is provided with a lug 4 adapted to engage the steering column and having pivoted thereto at 5, a hasp 6. This hasp has a series of lugs or ribs 7 entering corresponding recesses in the lock casing, the lock casing being also provided with ribs or lugs 8 between the recesses, alternating with the ribs 7. The ribs 7 and 8 are provided with alining apertures adapted to receive a screw 9, so as to securely retain or lock the hasp 6 in operative position to attach the lock casing to the steering column. The lock casing is provided with a cover 10 pivoted at 11 on the lock casing, while the free end of the lock casing has a locking device, such as a cylinder lock 12, whose bolt 13 engages with a corresponding keeper 14 on the lock casing, in order to securely lock the cover on the casing. It will be noted that the head of the screw 9 is only accessible for operation to lock and release the hasp 6 when the cover is opened. In order to provide additional means for securely clamping the lock casing on the steering column, the hasp 6 is provided with a set screw 15 threaded into the hasp and adapted to engage and clamp the steering column.

Mounted in the lock casing for sliding and rotating movement is a cylindrical bolt 16 having a beveled end 17 adapted to engage a corresponding keeper recess 18 in the steering shaft 2, the steering column being also provided with a corresponding recess 19. The bolt is provided with a head 20 to permit operation thereof, and in order to cause rotative movement of the bolt to shift the same axially, this bolt is provided with a cam recess 21 adapted to engage with a cam pin or abutment 22 mounted in the cover 10. It will, therefore, be seen that when the bolt is given a rotative movement, it will move axially to move the end 17 into and out of coöperative relation with the keeper 18 in the steering column.

The bolt is provided with a recess or tumbler way 23, adapted to be engaged by the ends of tumblers 24 and 25, these tumblers being mounted for sliding movement in ways in the casing, these ways being formed by partition plates 26 in the casing. The tumblers 24 constitute the normally active tumblers, that is, they normally engage the bolt, and each of these tumblers 24 has a lug 27, the lugs being collectively engaged by a cross-bar 28 having at its ends, bearings 29 sliding at each end on a shaft 30, mounted in lugs 31, 32 and 33 in the casing. Springs 34 mounted on the shaft 30, engage the bearings 29 and normally hold the cross-piece 28 against the lugs 32, and in this position they will, by the engagement with the lugs 27, hold the normally active tumblers 24 in engagement with the tumbler way 23 in the bolt.

The tumblers 25 constitute the normally inactive tumblers and each of these tumblers is provided with a lug 35 engaged by a cross-piece 36 having at its ends, bearings 37 engaging the shaft 30, and springs 38 on the shaft engage the bearings 37 to normally hold the cross-piece 36 against the lugs 32. The cross-piece 36 in the position shown, will normally tend, by the engagement with the lugs 35, to hold in position the normally inactive tumblers 35, so as to be clear of the tumbler way 23 in the bolt.

Pivoted at 39 in the lock casing, are a series of key levers 40, each provided with a key 41, and each provided with a pair of variant bearing cams 42 and 43 respectively, and each key lever is acted upon by a spring 44, tending to retain these keys in raised position. The normally active tumblers are each provided with an overhanging lug 45 having a cam face 46 engaged by the cam 42 on the key lever, so that depression of a key lever engaging an active tumbler will operate to move this tumbler out of the tumbler way 23 in the bolt, against the action of the springs 34. The way 47 of the tumbler is, however, so far away from the cam face 43 that it is not acted upon by the key lever. Each normally inactive tumbler 25 has a cam face 48 adapted to be engaged by a cam face 43 on a key lever, but this cam face is not acted upon by the cam face 42 on the key lever. Therefore, depression of a key opposite a normally inactive tumbler will operate to move the normally inactive tumbler into the tumbler way in the bolt.

The lugs 31, 32 and 33 are slotted to receive the shafts 30, and when the cover is, therefore, opened, these shafts with their cross-bars 28 and 36, and their springs 34 and 38, can, therefore, be bodily removed. This permits tumblers 24 and 25 to be placed in any suitable position in their ways, in order to obtain any suitable combination. The buttons 41 are furthermore provided with any suitable designation, such as letters as shown in Fig. 1, although it will be understood that the designation may be numerals. In the particular illustration as shown in Fig. 1, normally active tumblers are placed opposite the key levers Q and T, while the normally inactive tumblers are placed opposite the key levers P and S. Consequently, the lock can only be opened when Q and T are depressed, as this will move the corresponding normally active tumblers out of engagement with the bolt to free this bolt. The depression of the keys P or S, or either, will, however, lock the bolt even though the keys Q and T are depressed at the same time. The normally inactive tumblers operate to still further complicate the combination.

Assuming that only the keys Q and T are depressed, thereby withdrawing the corresponding tumblers 24 out of the tumbler way 23 in the bolt, when these keys are held depressed, the bolt can be turned to withdraw it from the keeper recess in the steering shaft, so as to permit turning thereof. When the keys are now released, the tumblers will be forced by the springs 34 against the face of the bolt, but the springs 34 can return the keys Q and T at this time, since the recess between the cam faces 46 and 47 is wide enough to permit such movement of the cam ends of the key levers even when the tumblers are withdrawn. As soon, however, as the bolt is again returned by rotative movement to move it axially into the keeper in the steering wheel, the alinement of the tumbler way 23 with the normally active tumblers, will cause the springs 34 to move these tumblers into the tumbler way and thus again securely lock the bolt in active position. It will be understood that the ends of the cam recess 21 in the bolt, by their engagement with the abutment 22, will operate to stop the bolt in its axial movement, and will also serve to accurately position said tumbler way 23 in correct alinement with the tumblers when the bolt is in active position. It will be noted that the combination can be changed only by the holder of the key controlling the lock 12. Consequently, this key can be held by the owner of the automobile, and a chauffeur can, therefore, not change this combination. It will furthermore be noted that the lock casing cannot be detached from the automobile, except by the holder of the keys for the lock 12, since the screw 9 cannot be removed until the cover is open.

It will, therefore, be seen that the invention accomplishes its objects. An automobile lock is produced which is simple in construction, effective in its action, and exceedingly cheap to manufacture, and a large number of combinations may be obtained with a small number of tumblers. The lock can be readily attached to any automobile, and when in position will securely lock the same against unauthorized use. In view of the fact that the combination is obtained by a series of buttons, the lock can be opened and closed in the dark, and by touch.

It is obvious that various changes may be made in the details of construction without departing from the spirit of this invention; it is to be understood that this invention is not to be limited to the specific construction shown and described.

Having thus described the invention, what is claimed is:

1. In a combination lock, a tumbler having parallel sides and a cam-shaped edge adapted by engagement with a key lever to be moved in a rectilinear path into locking engagement and a key lever adapted to move said tumblers.

2. In a combination lock, a tumbler having parallel sides and a cam-shaped edge adapted by engagement with a key lever to be moved in a rectilinear path out of locking engagement and a key lever adapted to move said tumblers.

3. In a combination lock, a bolt, a tumbler having parallel sides and a cam-shaped edge adapted by engagement with a key lever to be moved in a rectilinear path into locking engagement with said bolt and having a lug, a key lever adapted to move said tumblers, and means engaging said lug adapted to return said tumbler to inactive position.

4. In a combination lock, a bolt, a tumbler having parallel sides and a cam-shaped edge adapted by engagement with a key lever to be moved in a rectilinear path out of locking engagement with said bolt and having a lug, a key lever adapted to move said tumbler, and means engaging said lug adapted to return said tumbler to locking position.

5. In a combination lock, a bolt, a series of tumblers having parallel sides and cam-shaped edges adapted by engagement with a corresponding series of key levers to be moved into a rectilinear path, some into and some out of locking engagement with said bolt, and a series of key levers adapted to move said tumblers.

6. In a combination lock, a bolt, a series of tumblers, having parallel sides and cam-shaped edges adapted by engagement with a corresponding series of key levers to be moved into a rectilinear path, some into and some out of locking engagement with said bolt, said tumblers having lugs, means engaging said lugs adapted to return said tumblers to normal position, and a series of key levers adapted to move said tumblers.

In testimony whereof I affix my signature this 23 day of February, 1918.

JOSEF F. SCHICKE.